R. KOCH.
VALVE.
APPLICATION FILED MAR. 14, 1908

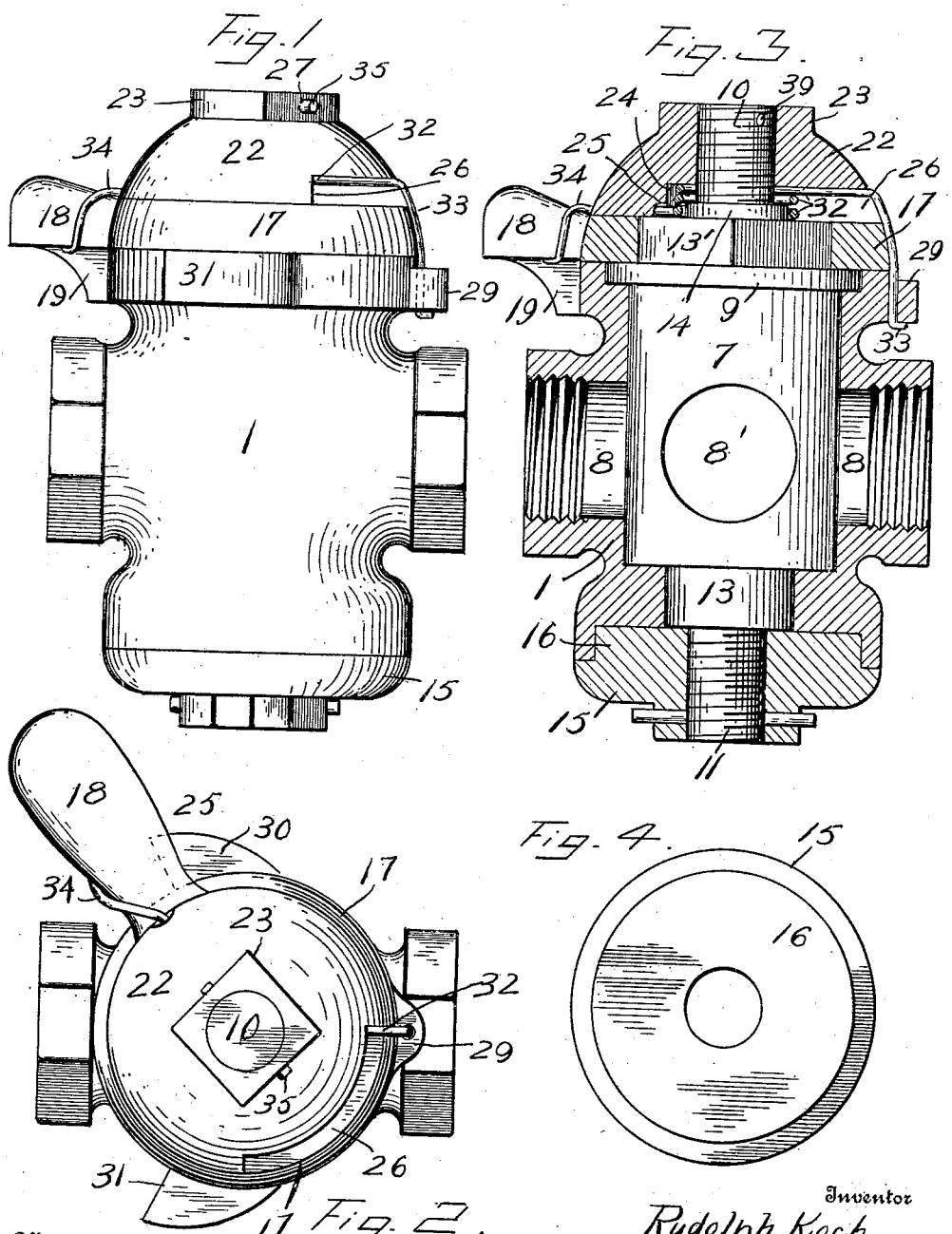

908,278.

Patented Dec. 29, 1908.
2 SHEETS—SHEET 2.

Witnesses
J. C. Simpson
Geo. W. Sule

Inventor
Rudolph Koch
By Chandlee & Chandlee
Attorneys

UNITED STATES PATENT OFFICE.

RUDOLPH KOCH, OF TEMPLE, TEXAS.

VALVE.

No. 908,278.  Specification of Letters Patent.  Patented Dec. 29, 1908.

Application filed March 14, 1908. Serial No. 421,120.

*To all whom it may concern:*

Be it known that I, RUDOLPH KOCH, a citizen of the United States, residing at Temple, in the county of Bell, State of Texas, have invented certain new and useful Improvements in Valves; and I do hereby declare the following to be a full, clear, and exact description of the invention, such as will enable others skilled in the art to which it appertains to make and use the same.

This invention relates to a new and useful improvement in valves.

The object of my invention is more particularly to provide a valve of that class known as blow-off valves, so constructed that when the valve is opened, the plug will be automatically turned to close the discharge port, the instant the operating power is removed, the valve being normally held in a spring-closed condition.

Figure 5:
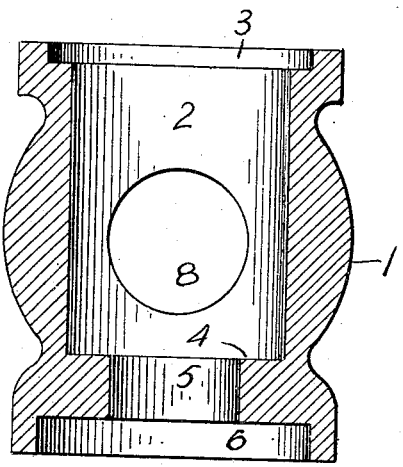
Figure 6:
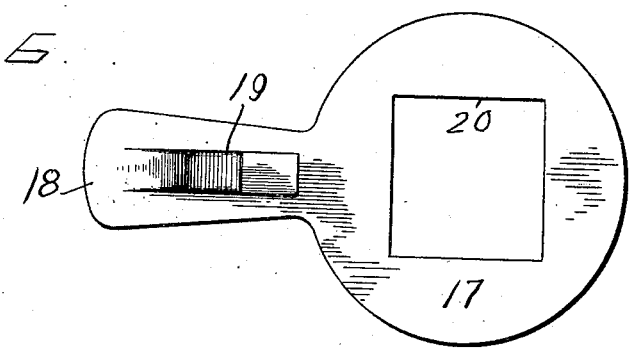
Figure 7:
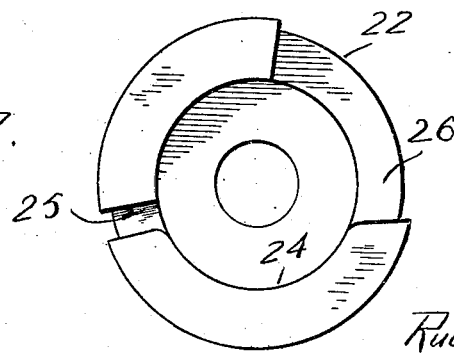

In the accompanying drawings, I have shown in Figure 1, a side view of a valve embodying my invention. Fig. 2, shows a top view thereof. Fig. 3, shows a central sectional view. Fig. 4, discloses a top view of the lower nut. Fig. 5, is a detached sectional view of the valve housing. Fig. 6, is an underface view of the washer-provided operating handle, and Fig. 7, an underface view of the apertured washer.

The aim of my invention is, to provide a valve normally held in a closed position by means of a suitable spring.

In the fulfillment of the aim of my invention, I use a suitable valve case or housing 1, provided with the valve bore or plug seating 2, this case having at its upper end the seat 3, near its lower end the shoulder forming projection 4, the guide opening 5, and the lower nut seat 6, as clearly indicated in Fig. 5. It is of course understood that this case is provided with the usual intake and exit ports 8.

In connection with this case, I use a valve plug comprising the cylindrical portion 7, having the passage 8' the projecting flange 9, the lower threaded stem 11, and upper threaded stem 10. Positioned between the plug 7 and the stem 11, is the collar 13, while positioned between the flange 9 and the upper stem 10, is the square shoulder 13', and the cylindrical collar or shoulder 14, as clearly indicated in Fig. 3. The flange 9, rests within the seat 3, while the lower portion of the plug rests upon the shoulder-forming portion 4, the collar 13 being guided within the opening 5. Threaded upon the lower stem 11, is a nut 15, provided with the extension 16, adapted to rest within the nut seat 6, to securely hold the plug within its seat. Working upon the square collar 13', of the plug is the handle provided washer 17, having the square opening 20 engaging the square collar 13', the operating handle 18 being suitably projected from this washer and provided with the stop lug 19. Secured upon the upper threaded stem 10, is the apertured nut 22, having the squared wrench engaging portion 23, the interior chamber 24, and the apertures or sockets 25 and 26, as disclosed in Fig. 7. As shown, the stem 10, of the plug 7, is provided with a pin opening 39, while the apertured nut 22, is provided with the pin opening 27.

Referring to Fig. 1 it will be noticed that the housing is provided with a perforated lug 29. Upon opposite sides this case or housing 1, is provided with the stop lugs 30 and 31, as indicated in Fig. 2. Now these stop lugs are used to check the movement of the plug in that the lug 19 is adapted to come into engagement with the lugs 30 and 31, in the operation of the valve. To normally hold the valve in a closed condition I employ a coil spring 32, one end 33 of which is bent outward and downward to be brought into engagement with the lug 29, the remaining end 34, of this spring being brought into engagement with the operating handle 18, the instrumentalities being so arranged that the spring 32 will normally hold the valve in closed condition. The end 34 of the spring 32, extends through the aperture 25, while the end 33, is held within the enlarged aperture or socket 26, so that this nut 22, may be freely rocked from side to side without interfering with the spring portion 33. A valve constructed according to my invention may be cheaply constructed and easily taken apart when it is necessary to clean the same, and it is of course understood that these valves may be made of different sizes. The nut forming portion 22 is secured to the stem 10 by means of a pin 35 passing through the openings 27 and 39. And

Having thus described my said invention what I claim as new is—

1. A valve having in combination, a housing with an upper seat and a lower guide opening, a plug having a transverse discharge passage, an upper flange adapted to ride within said upper seat and a lower collar adapted to work within said guide opening, the lower end of said plug having a threaded end, the upper end of said plug having a square shoulder and a reduced stem, a nut secured to said lower threaded end, an operating handle having a washer portion engaging said square shoulder and resting upon said case, and a coil spring encircling said upper stem having one end secured to said housing and the other being in engagement with said handle, all arranged as set forth.

2. A valve having in combination, a housing with an upper seat and a lower guide opening, a plug having a transverse discharge passage, an upper flange to ride within said upper seat and a lower collar to work into said guide opening, the lower end of said plug being threaded, the upper end of said plug having a square shoulder and a reduced threaded stem, a nut secured to said lower threaded end, an operating handle having a washer portion secured to said square shoulder and resting upon the upper end of said case, an apertured nut secured to said upper stem and working upon said washer portion and a coil spring encircling said upper stem, and extending through the apertures of said nut and having one end engaged by said handle and the other by said housing in the manner set forth.

In testimony whereof, I affix my signature, in presence of two witnesses.

RUDOLPH KOCH.

Witnesses:
M. H. BROWN,
S. C. SAMUELS.